US008349057B2

(12) United States Patent
Holten et al.

(10) Patent No.: US 8,349,057 B2
(45) Date of Patent: Jan. 8, 2013

(54) METHOD FOR THE BACKFLUSHING OF FILTERS

(75) Inventors: Wolfgang Holten, Dusseldorf (DE); Arnold Kalka, Datteln (DE); Miroslav Podhorsky, Ratingen (DE); Horst Hoffmann, Ratingen (DE); Friedel Kordas, Recklinghausen (DE)

(73) Assignee: Balcke-Durr GmbH, Ratingen (DE)

( * ) Notice: Subject to any disclaimer, the term of this patent is extended or adjusted under 35 U.S.C. 154(b) by 415 days.

(21) Appl. No.: 12/128,563

(22) Filed: May 28, 2008

(65) Prior Publication Data

US 2009/0020012 A1 Jan. 22, 2009

(30) Foreign Application Priority Data

Jun. 1, 2007 (EP) .................................. 07010887

(51) Int. Cl.
*B01D 46/04* (2006.01)

(52) U.S. Cl. ........................................... 95/280; 55/302

(58) Field of Classification Search ............... 95/278, 95/280, 279; 55/302, 301, 303, 304, 305; 96/428
See application file for complete search history.

(56) References Cited

U.S. PATENT DOCUMENTS

| 3,646,730 | A | * | 3/1972 | Reid | 55/302 |
|---|---|---|---|---|---|
| 3,864,108 | A | | 2/1975 | Brookman | |
| 4,292,053 | A | * | 9/1981 | Remillieux | 95/279 |
| 5,094,675 | A | * | 3/1992 | Pitt et al. | 95/20 |
| 5,242,472 | A | * | 9/1993 | Sellakumar | 95/280 |
| 5,388,326 | A | * | 2/1995 | Beeson et al. | 29/611 |
| 5,780,126 | A | * | 7/1998 | Smith et al. | 428/34.5 |
| 5,843,206 | A | * | 12/1998 | Dehn et al. | 95/26 |
| 5,873,017 | A | * | 2/1999 | Soga et al. | 399/302 |
| 5,948,127 | A | * | 9/1999 | Minakawa et al. | 55/283 |
| 6,302,931 | B1 | * | 10/2001 | Min | 55/283 |
| 7,357,829 | B2 | * | 4/2008 | Ehlers | 95/279 |
| 7,422,626 | B2 | * | 9/2008 | Feugier | 95/279 |
| 2003/0041732 | A1 | * | 3/2003 | Alford et al. | 95/280 |
| 2004/0219077 | A1 | * | 11/2004 | Voss et al. | 422/177 |
| 2007/0039290 | A1 | | 2/2007 | Lee | |
| 2007/0157809 | A1 | * | 7/2007 | Ehlers | 95/280 |

FOREIGN PATENT DOCUMENTS

| GB | 1314206 | 4/1973 |
|---|---|---|
| JP | 2007175635 | 7/2007 |
| WO | 2007041955 A1 | 4/2007 |

OTHER PUBLICATIONS

B. Bastian, S. Zacher, E. Schmidt;"The Physics of Dust Filter Caking," Safety Engineering/Environmental Protection, University of Wuppertal, Germany and Wolfgang Timm, FLUENT NEWS Germany; Fall 2006.
L. McConnell, B. Taylor, O. Lijap, H. Litke; "Der Umbau einer Elektrofilter-Anlage in eine Schlauchfilter-Anlage," Ein Bericht uber Konzept, Engineering, Realisierung und Erfolgsgeschichten, Jun. 2000, BHA Group GmbH, info@bha.de.

* cited by examiner

*Primary Examiner* — Duane Smith
*Assistant Examiner* — Thomas McKenzie
(74) *Attorney, Agent, or Firm* — Baker & Hostetler LLP

(57) ABSTRACT

Air filters comprising thin-walled textile filter bodies have to be cleaned periodically. According to a method known to this purpose, the filtered material is loosened using pressure pulses in a flushing air flow. According to the invention, for generating the pressure pulses a plurality of small, quick-acting valves are in each case briefly opened, the opening moments being adapted to one another in such a way that partial pulses released thereby arrive simultaneously at the inlet of a flushing line common thereto.

10 Claims, 1 Drawing Sheet

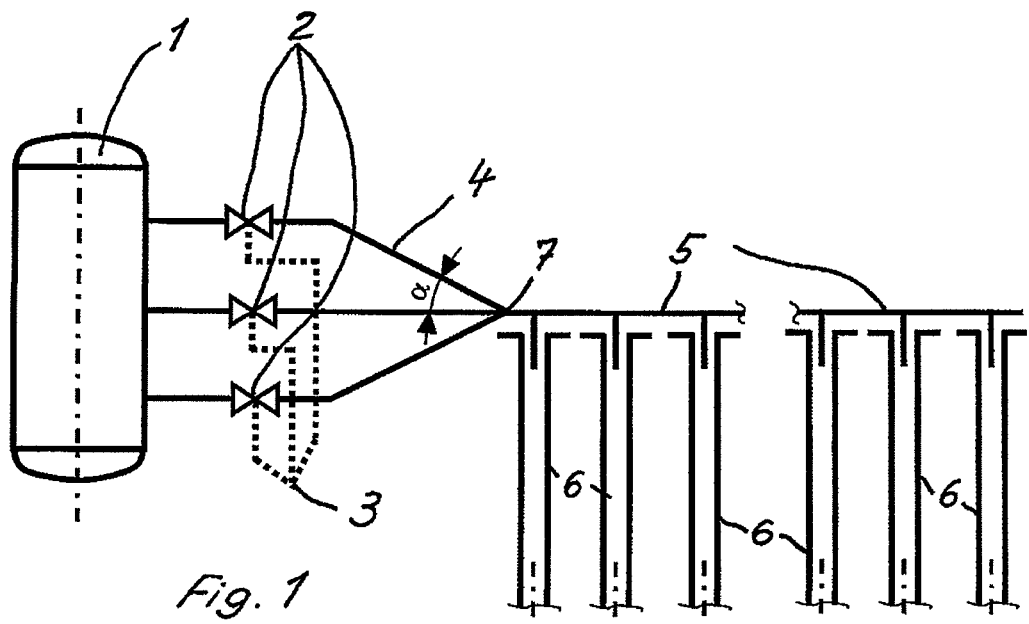
Fig. 1
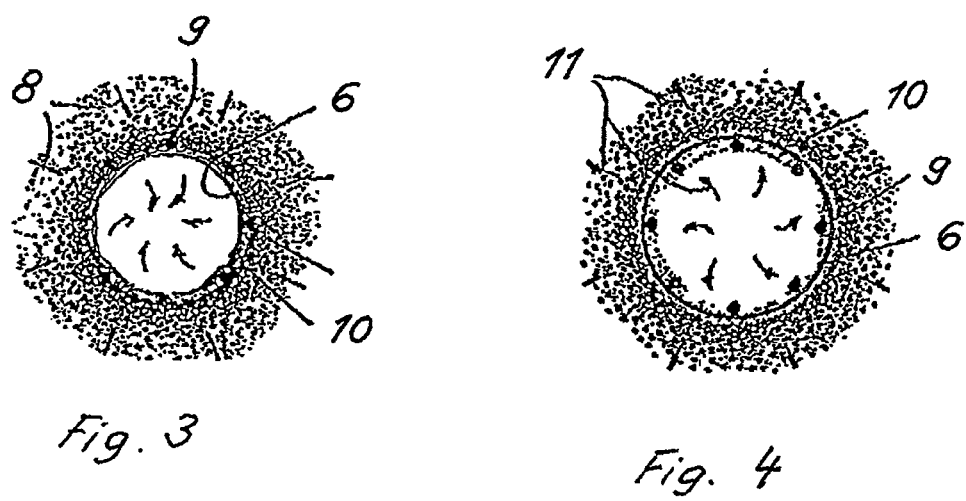
Fig. 2
Fig. 3
Fig. 4

METHOD FOR THE BACKFLUSHING OF FILTERS

FIELD OF THE INVENTION

The invention relates to a method for the backflushing of filters made of thin-walled textile filter bodies using pressure pulses in a flushing air flow.

BACKGROUND OF THE INVENTION

Filter bodies of filters, in particular of very large, industrially used filter systems, have to be cleaned at specific intervals in order to preserve their filtering function. Also, the removal of the filtered-out substances from the surface of the filter body or bodies reduces an inevitable drop in pressure occurring on the filter body during operation and thus maintains the function and lowers the operating costs.

In known filters comprising textile filter bodies in the form of textile tubes, this is carried out by a compressed air pulse which passes through the textile tubes and thus loosens filtered material which has accumulated on the outer wall of these textile tubes. The loosened filtered material can then be removed quickly using little energy.

However, as the system size of filters increases, so too does the nominal width of a valve from which pressure pulses are released. The increase in the nominal width of this valve is at the same time almost inevitably accompanied by an increase in the inertia of the valve during the opening process, thus slowing down the rise in pressure at the leading edge of the pressure pulse released thereby and reducing the cleaning effect thereof.

The invention is therefore based on the object of generating particularly effective pressure pulses which reliably ensure detachment of the filtered material and thus the operational reliability of the filter.

SUMMARY OF THE INVENTION

According to the invention, this object is achieved by dividing the function of one filter for generating pressure pulses into a plurality of small, quick-acting valves which are connected in parallel and the opening times of which are adapted to one another in such a way that partial pulses generated thereby arrive simultaneously at the inlet of a flushing line common thereto. As a result of the smaller masses to be moved during the opening process in the small, quick-acting valves, the pressure rises at the start of the pulses much more rapidly than in a single larger valve, thus perceptibly improving the function of the pressure pulse.

The quick-acting valves used are advantageously diaphragm valves which, despite an extremely short opening time, allow a good structure of the pulse in the rise in pressure, maintenance of pressure and drop in pressure. In this case, the total time of a pulse is approximately 100 milliseconds.

Expediently, at least two quick-acting valves (although any desired number of valves is also possible) are connected in parallel and all tap the same pressure container. The outlets of these valves meet as withdrawal lines, for example at an acute angle, in a Y-branch pipe which is reached by the partial pulses in synchronisation. The duration of the rise in pressure and maintenance of pressure within the same pulse is approximately the same but can also increase to up to twice the duration of the rise time.

In specific applications of the filter, in which for example there is a risk of undesirable chemical reactions of the substances to be filtered with the carrier gas for the pressure pulse, the compressed air is advantageously replaced by an inert gas, for example nitrogen.

In many cases, a large number of tubular filter bodies are connected in parallel in the filter and are advantageously acted on individually or successively in groups by pressure pulses. In order to protect the entry openings for the pressure pulses in the lower region of the tubular filter bodies from impurities, loosened filtered material is removed from the filter bodies counter to the direction of flow of the mixture to be filtered.

BRIEF DESCRIPTION OF THE DRAWINGS

An exemplary embodiment of the invention with three valves will be described in greater detail with reference to the drawings, in which respectively:

FIG. 1 shows a system for carrying out the method according to the invention comprising three valves;

FIG. 2 shows the pressure curve over time during a pressure pulse;

FIG. 3 is the cross through a filter body during filtering operation; and

FIG. 4 is the cross section through a filter body during cleaning-off of the filtered material from the filtered body.

DETAILED DESCRIPTION

A compressed air container 1 is provided with three withdrawal lines 4 for compressed air. During normal operation, the withdrawal lines 4 are closed by valves 2. Ends of the withdrawal lines 4 leading from the valves 2 on to a flushing line 5 form the edges of an equilateral pyramid, the tip of which protrudes into a Y-branch pipe 7, so that the withdrawal lines 4 open into the Y-branch pipe at uniform angles α to one another. The Y-branch pipe 7 connects the withdrawal lines 4 to the flushing line 5 and ends in the upwardly open ends of thin-walled textile filter bodies 6, merely the upper part of which is shown. The valves 2 are each individually opened and closed by a controller 3.

If now, for example, a correspondingly large drop in pressure on the wall of the filter bodies indicates that a specific amount of filtered material has been deposited on the outside of the filter bodies 6, flushing of the filter bodies 6 is introduced. For this purpose, the valves 2 are each individually opened in a controlled manner such that pressure pulses triggered thereby in the withdrawal lines 4 arrive in the flushing line 5 at the same time and combine to form a common pressure pulse which is introduced into the filter bodies 6 through the flushing line 5.

The pulses issuing from the flushing line have a characteristic shown in FIG. 2 and are introduced into the upwardly open filter bodies 6. In this case, a rise of up to 100 millibars is achieved for approximately 50 milliseconds in each individual pressure pulse, so that dust clinging to the filter bodies is loosened as the filtered material and can then be removed without difficulty.

The functioning of the filter bodies 6 will be described in greater detail with reference to FIGS. 3 and 4.

During the filtering operation illustrated in FIG. 3, the mixture to be filtered, consisting of air, gas and dust particles, flows in the direction of the arrow 8 from the outside toward the wall of the filter body 6. In this case, the wall, which consists of textile material, of the filter body 6 is pressed inward against a support basket 9, so that the wall of the filter body forms inwardly directed troughs. The filtered-out dust 10 collects in these troughs, which are each located between two struts of the support body 9, and forms a layer of increasing thickness.

On reaching the specific amount of filtered material indicated in paragraph [0013], the valves 2 are opened, so that the direction of flow in the walls of the filter bodies 6 is briefly inverted, as illustrated in FIG. 4, by released pressure pulses. These pressure pulses press the walls of the filter bodies 6 outward and loosen as a result, and owing to a spray gas stream caused thereby in the direction of the arrow 11, the dust 10 from the walls. The dust 10 falls downward and can, as mentioned hereinbefore, easily be removed from this location.

The invention claimed is:

1. Method for the backflushing of filters made of thin-walled textile filter bodies using pressure pulses in a flushing air flow, comprising:
    extending a plurality of separate withdrawal lines from a compressed air container, each withdrawal line meeting at a Y-branch pipe that combines a compressed airflow from each of the separate withdrawal lines into a single flush line;
    configuring each separate withdrawal line with an individual quick-acting valve for controlling the compressed airflow through each separate withdrawal line;
    measuring a pressure on the wall of the filter bodies; and
    generating a single pressure pulse through the single flush line, in response to a trigger effected by a correspondingly large drop in the pressure on the wall of the filter bodies, by individually opening each of the quick-acting valves to create a series of partial pressure pulses in each separate withdrawal line, the opening time of each individual valve being separately controlled so that the partial pressure pulses travel through the Y-branch pipe and arrive simultaneously at the inlet of the common flushing line as the single pressure pulse.

2. Method according to claim 1, wherein the small, quick-acting valves are diaphragm valves that are connected to a compressed air container via withdrawal lines, 3. Method according to one of claim 1, wherein the total opening time of the quick-acting valves is approximately 100 milliseconds per pulse.

4. Method according to claim 3, wherein three quick-acting valves work together.

5. Method according to claim 4, wherein the quick-acting valves tap the same compressed air container.

6. Method according to claim 5, wherein the partial pulses meet one another at an acute angle, $\alpha$, in a Y-branch pipe.

7. Method according to claim 6, wherein the duration for the pressure increase of the pulse is approximately equal to the duration of the maximum pressure during a pulse.

8. Method according to claim 7, wherein the compressed air is replaced by an inert gas, for example nitrogen.

9. Method according to claim 8, wherein the filter comprises a plurality of tubular filter bodies connected in parallel, which are successively acted on, individually or in groups, by pressure pulses.

10. Method according to claim 9, where the filtered material is removed from the filter bodies against the direction of flow of the mixture to be filtered.

* * * * *